(12) United States Patent
Erdmann et al.

(10) Patent No.: US 8,485,214 B2
(45) Date of Patent: Jul. 16, 2013

(54) SMALL ENGINE EMISSIONS CONTROL VALVE

(75) Inventors: Matthew Lorenz Erdmann, Ypsilanti, MI (US); Vaughn Kevin Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 406 days.

(21) Appl. No.: 12/488,942

(22) Filed: Jun. 22, 2009

(65) Prior Publication Data

US 2010/0319789 A1 Dec. 23, 2010

(51) Int. Cl.
*F24D 19/08* (2006.01)

(52) U.S. Cl.
USPC .......................................... 137/198; 137/197

(58) Field of Classification Search
USPC ................. 137/43, 202, 247.17, 197–200
See application file for complete search history.

(56) References Cited

U.S. PATENT DOCUMENTS

| | | | | | |
|---|---|---|---|---|---|
| 4,033,475 | A | * | 7/1977 | Evans | 137/43 |
| 4,136,796 | A | * | 1/1979 | Dubois et al. | 220/373 |
| 4,162,021 | A | * | 7/1979 | Crute | 137/43 |
| 4,685,584 | A | * | 8/1987 | Harris | 137/43 |
| 4,913,303 | A | * | 4/1990 | Harris | 137/43 |
| 4,971,104 | A | * | 11/1990 | Weber | 137/489.5 |
| 5,156,178 | A | * | 10/1992 | Harris | 137/43 |
| 5,353,949 | A | * | 10/1994 | Seibert et al. | 220/371 |
| 5,564,466 | A | * | 10/1996 | Aoyama et al. | 123/518 |
| 5,914,415 | A | * | 6/1999 | Tago | 55/385.4 |
| 6,557,719 | B1 | * | 5/2003 | Arnal et al. | 220/562 |
| 6,895,943 | B1 | | 5/2005 | Taxon | |
| 7,201,155 | B2 | | 4/2007 | Mills | |
| 7,213,583 | B2 | | 5/2007 | Mills | |
| 7,225,795 | B2 | | 6/2007 | Mills | |
| 7,234,452 | B2 | | 6/2007 | Mills | |
| 7,357,709 | B2 | * | 4/2008 | Zukor et al. | 96/6 |
| 7,491,258 | B2 | * | 2/2009 | Gouzou et al. | 137/588 |
| 7,628,143 | B2 | * | 12/2009 | Yamada et al. | 123/509 |
| 8,006,674 | B2 | * | 8/2011 | Mills et al. | 123/520 |
| 8,069,875 | B2 | * | 12/2011 | Mashiko | 137/846 |
| 2002/0112701 | A1 | | 8/2002 | Gracyalny et al. | |
| 2002/0144730 | A1 | | 10/2002 | Brock et al. | |
| 2006/0096258 | A1 | | 5/2006 | Gouzou et al. | |
| 2006/0196481 | A1 | | 9/2006 | Mills et al. | |
| 2007/0023016 | A1 | | 2/2007 | Mills et al. | |
| 2009/0025690 | A1 | * | 1/2009 | Yamada et al. | 123/509 |
| 2010/0236640 | A1 | * | 9/2010 | Erdmann | 137/197 |
| 2011/0168715 | A1 | * | 7/2011 | Erdmann et al. | 220/373 |

FOREIGN PATENT DOCUMENTS

WO 9109221 A1 6/1991

* cited by examiner

*Primary Examiner* — Craig Schneider
*Assistant Examiner* — Craig J Price
(74) *Attorney, Agent, or Firm* — Quinn Law Group, PLLC (57) ABSTRACT

A valve assembly for a fuel tank for a small engine includes a housing. A membrane is supported by the housing such that the membrane covers a housing opening. The membrane allows the passage of vapor through the membrane and into the housing cavity and prevents the passage of liquid through the membrane. A pressure relief valve is supported by the housing to control flow of a vapor through the housing cavity.

9 Claims, 5 Drawing Sheets

SMALL ENGINE EMISSIONS CONTROL VALVE

TECHNICAL FIELD

The invention relates to a valve assembly, and more particularly, to a liquid discriminating valve assembly for a fuel tank for a small engine.

BACKGROUND OF THE INVENTION

Valve assemblies to control the fluid level and vapor flow for fuel tanks are known. Fuel tanks used with small engines commonly work on a gravity feed system to transmit the fuel to the engine. With gravity feed systems, maintaining some pressure within the fuel tank is desirable. However, gravity feed systems will not operate under vacuum conditions. Thus, the valve assemblies must be able to vent vapor within the fuel tank and maintain the pressure level within the fuel tank. As is known, the vapor is typically vented into the intake line for the engine. Additionally, these valve assemblies will also vent vapor to maintain pressure within the fuel tank as a result of changes in the fuel level.

Rollover valves are installed in the fuel tanks to prevent the liquid from reaching the valve assemblies. However, the rollover valves are open during normal operating conditions. Therefore, some liquid may still escape through the valve assemblies due to sloshing of the liquid during normal fuel tank usage.

SUMMARY OF THE INVENTION

A valve assembly for a fuel tank for a small engine is provided. The valve assembly includes a housing. The housing defines a housing cavity and a vapor opening. The vapor opening allows vapor to enter the housing cavity from the fuel tank. A vapor outlet is also defined by the housing and allows the vapor to exit the housing cavity. A membrane is supported by the housing below the vapor opening such that the vapor must flow through the membrane to reach the vapor cavity. The membrane allows the passage of vapor and prevents the passage of liquid through the membrane. A pressure relief valve is supported by the housing to assist in controlling vapor flow through the housing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
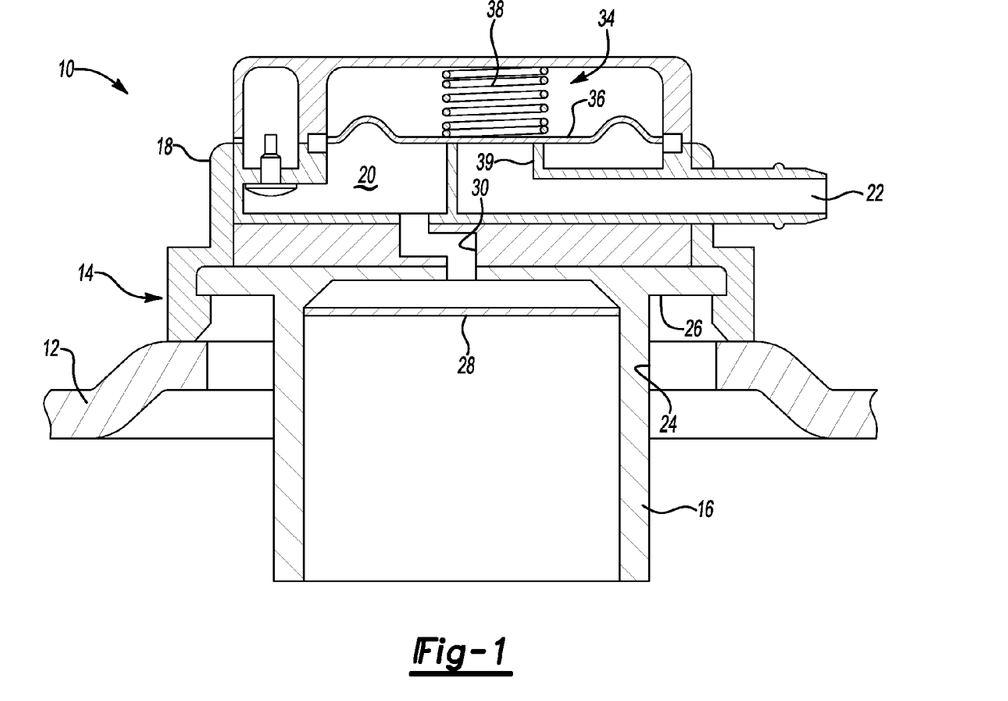
FIG. 1 is a schematic cross-sectional illustration of a small engine valve assembly mounted to a fuel tank.

Referring to the drawings, wherein like reference numbers refer to like components, FIG. 1 shows a valve assembly 10 mounted to a fuel tank 12. The valve assembly 10 is for use with a fuel tank for a small engine, e.g. a lawn mower engine. The valve assembly 10 has a housing 14. A first housing portion 16 is located primarily within the fuel tank 12. A second housing portion 18 is located primarily outside of the fuel tank 12. The housing 14 also defines a housing cavity 20, also referred to as a vent opening, which is in fluid communication with a vapor outlet 22. The first housing portion 16 is inserted within an opening 24 in the fuel tank 12.

The embodiment shown illustrates the valve assembly 10 mounted directly to the fuel tank 12. Other arrangements for mounting the valve assembly 10 to the fuel tank 12, or incorporating the valve assembly 10 into other components prior to mounting on the fuel tank 12 may also be utilized. One skilled in the art would know the desired arrangements for particular fuel tank 12 and valve assembly 10 combinations. For example, the first housing portion 16 could also be mounted externally with a passageway that allows communication with the interior of the fuel tank 12.

The first housing portion 16 includes a flange 26 that is located outside of the fuel tank 12 to prevent the valve assembly 10 from passing entirely through the tank hole 24 and into the fuel tank 12. The second housing portion 18 is secured to the first housing portion 16 at the flange 26.

A membrane 28 is secured to the housing 14. That is, the membrane 28 is secured to one of the first housing portion 16 and the second housing portion 18. In the illustrated embodiment, the membrane 28 is secured to the first housing portion 16. The membrane 28 may be secured to the housing 14 by welding, adhesive, heat sealing, insert molding, or other methods. One skilled in the art would know the appropriate attachment required for particular membrane 28 and housing 14 arrangements.

The membrane 28 is a liquid discriminating, vapor permeable membrane. That is, the membrane 28 is of a material that allows vapor to pass through the membrane 28 but prohibits liquid from passing through. The size of the housing opening 30 may be set to control the maximum amount of vapor that may pass through the membrane 28 at one time. A housing opening 30 located within the housing 14 allows vapor to exit the fuel tank 12. The membrane 28 is secured to the housing 14 such that the membrane extends across the entire housing opening 30.

The membrane 28 is illustrated as a generally flat membrane. However, the membrane 28 may also be a cylinder or may be pleated to increase the surface area of the membrane 28. One skilled in the art would know the proper shape for a membrane 28 for a particular valve assembly 10 arrangement.

Additionally, as the membrane 28 is exposed to liquid, the liquid may slow the flow rate of the vapor through the membrane 28. The first housing portion 16 of the valve assembly 10 deters liquid from reaching the membrane 28. Thus, the first housing portion 16 helps maintain the vapor flow rate through the membrane 28 at a predetermined level.

The valve assembly 10 includes a pressure relief valve 34. The pressure relief valve 34 is spring type valve. The pressure relief valve 34 is also a head valve. That is, the pressure relief valve 34 is located above the fuel tank 12. Further, the pressure relief valve 34 is located between the membrane 28 and the vapor outlet 22.

The pressure relief valve 34 includes a diaphragm (or plate) 36 and a valve spring 38. The diaphragm 36 is located above the membrane 28 within the housing cavity 20. The valve spring 38 applies a force to the diaphragm 36 such that the diaphragm 36 blocks the opening 39 of the vapor outlet 22. When the vapor pressure within the fuel tank 12 reaches a sufficient level, the vapor pressure applied to the diaphragm 36 overcomes the force on the diaphragm 36 applied by the valve spring 38, lifting diaphragm 36 off the opening of the vapor outlet 22. The vapor may exit the housing cavity 20 through the vapor outlet 22. As the vapor escapes the fuel tank 12, the pressure within the fuel tank 12 decreases and the diaphragm 36 returns to the resting position, blocking the vapor outlet 22, as shown in FIG. 1. Vapor will not exit the fuel tank 12 until the vapor pressure again increases to a level that will raise the diaphragm 36 off the housing 14 and open the housing cavity 20 to the vapor outlet 22.

Figure 2:
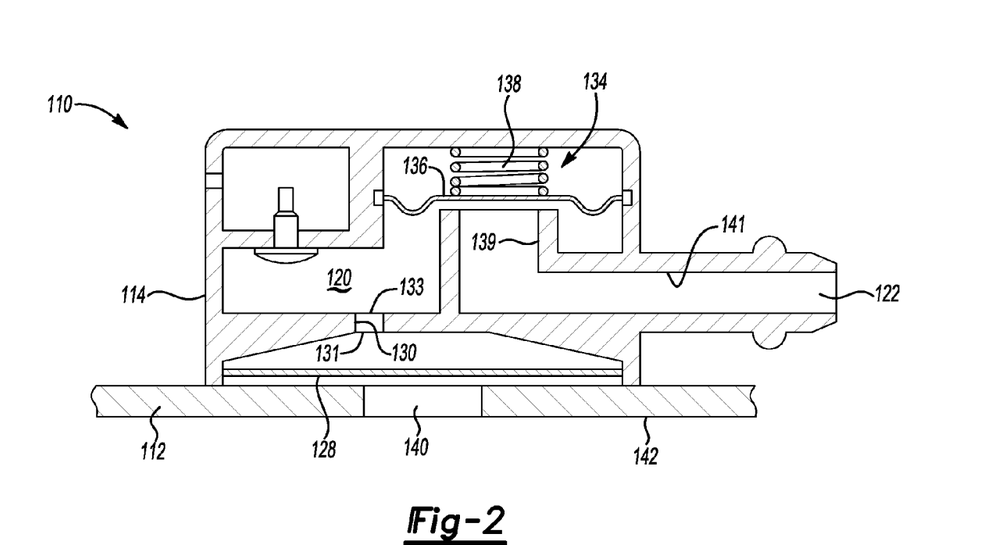
FIG. 2 is a schematic cross-sectional illustration of a second embodiment of a small engine valve assembly.

FIG. 2 illustrates a second embodiment of a valve assembly 110 having a membrane 128 for use with a fuel tank 112. The valve assembly 110 is for use with a fuel tank 112 for a small engine. The valve assembly 110 has a housing 114. The housing 114 is mounted externally of the fuel tank 112. The embodiment shown illustrates the valve assembly 110 mounted directly to the fuel tank 112. Other arrangements for mounting the valve assembly 110 to the fuel tank 112 or incorporating the valve assembly 110 into other components prior to mounting on the fuel tank 112 may also be used. One skilled in the art would know the desired arrangements for particular fuel tank 112 and valve assembly 110 combinations.

The fuel tank 112 defines a fuel tank opening 140, which allows vapor to exit the fuel tank 112. The housing 114 also defines a housing cavity 120, also referred to as a vent opening, which is in fluid communication with a vapor outlet 122.

A membrane 128 is secured to the housing 114. The membrane 128 may be secured to the housing 114 by welding, adhesive, heat sealing, insert molding, or other methods. One skilled in the art would know the appropriate attachment required for particular membrane 128 and housing 114 arrangements.

The membrane 128 is a liquid discriminating, vapor permeable membrane. That is, the membrane 128 is of a material that allows vapor to pass through the membrane 128 but prohibits liquid from passing through. The membrane 128 is secured to the housing 114 such that the membrane extends across an entire housing opening 130 and is on an opposite side 131 of the housing opening 130 than the side 133 that the housing cavity 120 is on, as shown in FIG. 2. The housing opening 130 located within the housing 114 allows vapor from the fuel tank 112 to enter the housing cavity 120. The size of the housing opening 130 may be selected to control the maximum amount of vapor that may pass through the membrane 128 at one time. The membrane 128 may also be secured to the housing 114 such that the membrane 128 extends over the entire fuel tank opening 140. The fuel tank opening 140 may alternatively, be set to control the maximum amount of vapor that may pass through the membrane 128 at one time.

The membrane 128 is illustrated as a generally flat membrane 128. However, the membrane 128 may also be a cylinder or may be pleated to increase the surface area of the membrane 128. One skilled in the art would know the proper shape for a membrane 128 for a particular valve assembly 110 arrangement.

Additionally, as the membrane 128 is exposed to liquid, the liquid may slow the flow rate of the vapor through the membrane 128. Walls 142 of the fuel tank 112 may help deter liquid from reaching the membrane 128 to maintain the vapor flow rate through the membrane 128 at a predetermined level.

The valve assembly 110 includes a pressure relief valve 134. The pressure relief valve 134 is spring type valve. The pressure relief valve 134 is also a head valve. That is, the pressure relief valve 134 is located above the fuel tank 112. Further, the pressure relief valve 134 is located between the membrane 128 and the vapor outlet 122.

The pressure relief valve 134 includes a diaphragm (or plate) 136 and a valve spring 138. The diaphragm 136 is located above the membrane 128 within the housing cavity 120. The valve spring 138 applies a force to the diaphragm 136 such that the diaphragm 136 blocks the opening of the vapor outlet 122. As shown in FIG. 2, the housing 114 defines a passage 141 from the diaphragm 136 to the vapor outlet 122 that extends laterally with respect to the housing opening 130, the diaphragm 136, and the membrane 128. When the vapor pressure within the fuel tank 112 reaches a sufficient level, the vapor force applied to the diaphragm 136 overcomes the force on the diaphragm 136 applied by the valve spring 138, lifting diaphragm 136 off the opening 139 of the vapor outlet 122, as shown in FIG. 2. The vapor may then exit through the vapor outlet 122. As the vapor escapes the fuel tank 112, the pressure within the fuel tank 112 decreases and the valve spring 138 returns the diaphragm 136 to the resting position, blocking the vapor outlet 122. Vapor will not exit the fuel tank 112 until the vapor pressure again increases to a level that will raise the diaphragm 136 off the housing 114 and open the housing cavity 120 to the vapor outlet 122.

Figure 3:
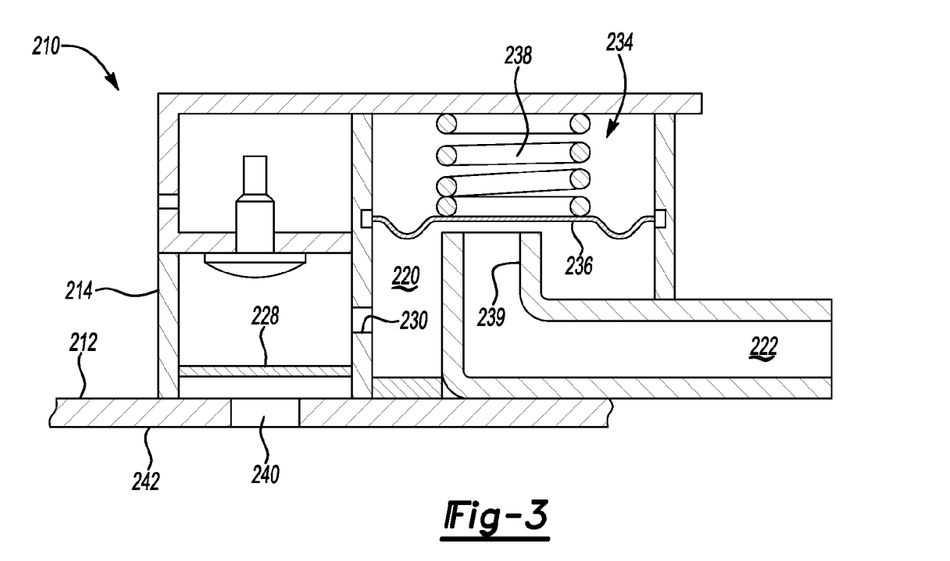
FIG. 3 is a schematic cross-sectional illustration of a third embodiment of a small engine valve assembly.

FIG. 3 illustrates a third embodiment of the valve assembly 210 mounted to a fuel tank 212. The valve assembly 210 is for use with a fuel tank 212 for a small engine. The valve assembly 210 has a housing 214. The housing 214 is mounted externally of the fuel tank 212. The embodiment shown illustrates the valve assembly 210 mounted directly to the fuel tank 212. Other arrangements for mounting the valve assembly 210 to the fuel tank 212, or incorporating the valve assembly 210 into other components prior to mounting on the fuel tank 212 may also be utilized. One skilled in the art would know the desired arrangements for particular fuel tank 212 and valve assembly 210 combinations.

The fuel tank 212 defines a fuel tank opening 240 that allows vapor to exit the fuel tank 212. The housing 214 also defines a housing cavity 220, also referred to as a vent opening, which is in fluid communication with a vapor outlet 222.

A membrane 228 is secured to the housing 214. The membrane 228 may be secured to the housing 214 by welding, adhesive, heat sealing, insert molding, or other methods. One skilled in the art would know the appropriate attachment required for particular membrane 228 and housing 214 arrangements.

The membrane 228 is a liquid discriminating, vapor permeable membrane. That is, the membrane 228 is of a material that allows vapor to pass through the membrane 228 but prohibits liquid from passing through. A housing opening 230 located within the housing 214, allows vapor from the fuel tank 212 to enter the housing cavity 220. The membrane 228 is secured to the housing 214 such that the membrane extends across the space between the opening 240 and the entire housing opening 230. The size of the housing opening 230 may be selected to control the maximum amount of vapor that may pass through the membrane 228 at one time. The membrane 228 may also be secured to the housing 214 such that the membrane 228 extends over the entire fuel tank opening 240. The fuel tank opening 214 may, alternatively, be configured to control the maximum amount of vapor that may pass through the membrane 228 at one time.

The membrane 228 is illustrated as a generally flat membrane 228. However, the membrane 228 may also be a cylinder or may be pleated to increase the surface area of the membrane 228. One skilled in the art would know the proper shape for a membrane 228 for a particular valve assembly 210 arrangement.

Additionally, as the membrane 228 is exposed to liquid, the liquid may slow the flow rate of the vapor through the membrane 228. Walls 242 of the fuel tank 212 may help deter liquid from reaching the membrane 228 to maintain the vapor flow rate through the membrane 228 at a predetermined level.

The valve assembly 210 includes a pressure relief valve 234. The pressure relief valve 234 is spring type valve. The pressure relief valve 234 is also a head valve. That is, the pressure relief valve 234 is located above the fuel tank 212. Further, the pressure relief valve 234 is located between the membrane 228 and the vapor outlet 222.

The pressure relief valve 234 includes a diaphragm (or plate) 236 and a valve spring 238. The diaphragm 236 is located above, or downstream, of the membrane 228 within the housing cavity 220. The valve spring 238 applies a force to the diaphragm 236 such that the diaphragm 236 blocks opening 239 of the vapor outlet 222. When the vapor pressure within the fuel tank 212 reaches a sufficient level, the vapor force applied to the diaphragm 236 overcomes the force on the diaphragm 236 applied by the valve spring 238, lifting the diaphragm 236 off the opening 239 of the vapor outlet 222. The vapor may exit through the vapor outlet 222. As the vapor escapes the fuel tank 212, the pressure within the fuel tank 212 decreases the valve spring 238 and returns the diaphragm 236 to the resting position, blocking the vapor outlet 222. Vapor will not exit the fuel tank 212 until the vapor pressure again increases to a level that will raise the diaphragm 236 off the housing 214 and open the housing cavity 220 to the vapor outlet 222.

Figure 4:
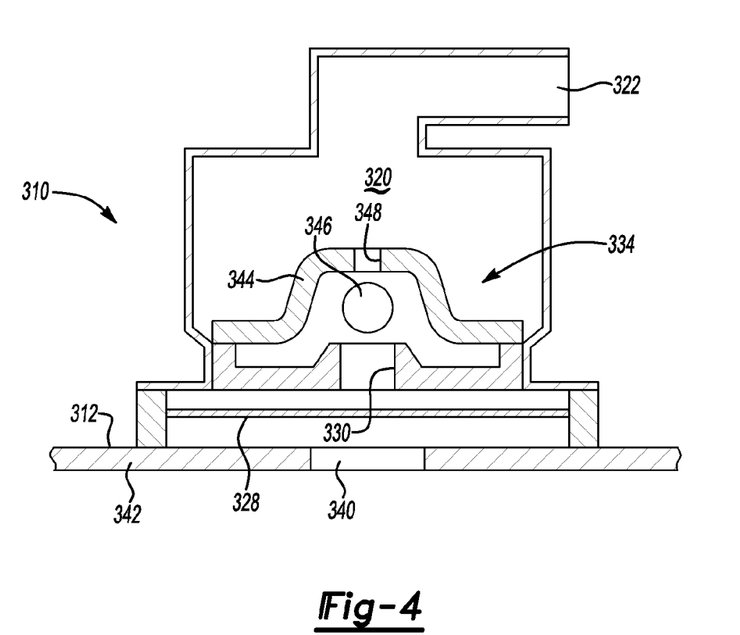
FIG. 4 is a schematic cross-sectional illustration of a fourth embodiment of a small engine valve assembly.

FIG. 4 illustrates a fourth embodiment of the valve assembly 310 mounted to a fuel tank 312. The valve assembly 310 is for use with a fuel tank 312 for a small engine. The valve assembly 310 has a housing 314. The housing 314 is mounted externally of the fuel tank 312. The embodiment shown illustrates the valve assembly 310 mounted directly to the fuel tank 312. Other arrangements for mounting the valve assembly 310 to the fuel tank 312, or incorporating the valve assembly 310 into other components prior to mounting on the fuel tank 312 may also be utilized. One skilled in the art would know the desired arrangements for particular fuel tank 312 and valve assembly 310 combinations.

The fuel tank 312 defines a fuel tank opening 340, which allows vapor to exit the fuel tank 312. The housing 314 also defines a housing cavity 320, also referred to as a vent opening, which is in fluid communication with a vapor outlet 322.

A membrane 328 is secured to the housing 314. The membrane 328 may be secured to the housing 314 by welding, adhesive, heat sealing, insert molding, or other methods. One skilled in the art would know the appropriate attachment required for particular membrane 328 and housing 314 arrangements.

The membrane 328 is a liquid discriminating, vapor permeable membrane. That is, the membrane 328 is of a material that allows vapor to pass through the membrane 328 but prohibits liquid from passing through. At least one housing opening 330 is located within the housing 314 and allows vapor from the fuel tank 312 to enter the housing cavity 320. The membrane 328 is secured to the housing 314 such that the membrane 328 extends across the entire housing opening 330. The size of the housing opening 330 may be selected to control the maximum amount of vapor that may pass through the membrane 328 at one time. The membrane 328 may also be secured to the housing 314 such that the membrane 328 extends over the entire fuel tank opening 340. The fuel tank opening 340 may alternatively be selected to control the maximum amount of vapor that may pass through the membrane 328 at one time.

The membrane 328 is illustrated as a generally flat membrane 328. However, the membrane 328 may also be a cylinder or may be pleated to increase the surface area of the membrane 328. One skilled in the art would know the proper shape for a membrane 328 for a particular valve assembly 310 arrangement.

Additionally, as the membrane 328 is exposed to liquid, the liquid may slow the vapor flow rate through the membrane 328. Walls 342 of the fuel tank 312 may help deter liquid from reaching the membrane 328 to maintain the vapor flow rate through the membrane 328 at a predetermined level.

The valve assembly 310 includes a pressure relief valve 334. The pressure relief valve 334 includes a ball 346 located above the housing opening 330. The pressure relief valve 334 is a head valve. That is, the pressure relief valve 334 is located above the fuel tank 312. Further, the pressure relief valve 334 is located between the membrane 328 and the vapor outlet 322. The ball 346 for the pressure relief valve 334 is located above the housing 314, partially within the housing cavity 320. Vapor may exit the fuel tank 312 through the housing opening 330 which limits the flow. When the vapor pressure within the fuel tank 312 reaches a sufficient level, the ball 346 is lifted off the housing 314, as shown. The vapor may exit through the housing opening 330 around the sides of the ball 346. As the vapor escapes the fuel tank 312, the pressure within the fuel tank 312 decreases, and the ball 346 returns to the resting position on the housing 314 or within the housing opening 330. Vapor will not exit the fuel tank 312 through the housing opening 330 until the pressure within the fuel tank 312 again increases to a level that will raise the ball 346 off the housing 314.

The housing 314 also defines a housing portion 344 and a second housing opening 348. The second housing opening 348 is located above the ball 346 and is in vertical alignment with the housing opening 330. The housing portion 344 guides the ball 346 to remain over the housing opening 330. The second housing opening 348 may be smaller than the housing opening 330 to restrict the flow of vapor from the fuel tank 312. Alternatively, the second housing opening 348 may be larger than the housing opening 330, and the housing opening 330 will control the maximum flow rate of the vapor from the fuel tank 312. In either instance, the second housing opening 348 will be smaller than the ball 346 to assist in aligning the ball 346 with the housing opening 330.

Figure 5:
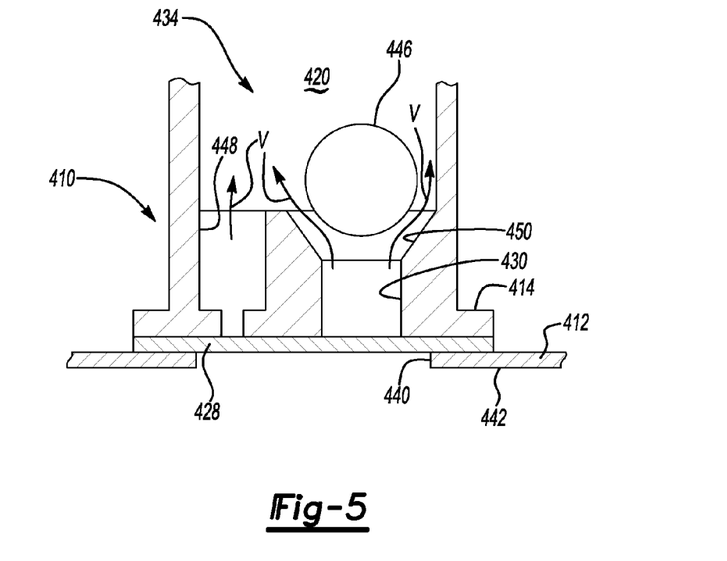
FIG. 5 is a schematic cross-sectional illustration in partially fragmentary view of a fifth embodiment of a small engine valve assembly.

FIG. 5 illustrates a fifth embodiment of the valve assembly 410 mounted to a fuel tank 412. The valve assembly 410 is for use with a fuel tank 412 for a small engine. The valve assembly 410 has a housing 414. The housing 414 is mounted externally of the fuel tank 412.

The embodiment shown illustrates the valve assembly 410 mounted directly to the fuel tank 412. Other arrangements for mounting the valve assembly 410 to the fuel tank 412, or incorporating the valve assembly 410 into other components prior to mounting on the fuel tank 412 may also be utilized. One skilled in the art would know the desired arrangements for particular fuel tank 412 and valve assembly 410 combinations.

The fuel tank 412 defines a fuel tank opening 440 which allows vapor to exit the fuel tank 412. The housing 414 also defines a housing cavity 420, also referred to as a vent opening, which is in fluid communication with a vapor outlet (not shown).

A membrane 428 is secured to the housing 414. The membrane 428 may be secured to the housing 414 by welding, adhesive, heat sealing, insert molding, or other methods. One skilled in the art would know the appropriate attachment required for particular membrane 430 and housing 414 arrangements.

The membrane 428 is a liquid discriminating, vapor permeable membrane. That is, the membrane 428 is of a material that allows vapor to pass through the membrane 428 but prohibits liquid from passing through. At least one housing opening 430 is located within the housing 414 and allows vapor from the fuel tank 412 to enter the housing cavity 420. The membrane 428 is secured to the housing 414 such that the membrane 428 extends over the entire housing opening 430. The size of the housing opening 430 may be selected to control the maximum amount of vapor that may pass through the membrane 428 at one time. The membrane may also be secured to the housing 414 such that the membrane 428 extends over the entire fuel tank opening 440. The fuel tank opening 414 may alternatively be set to control the maximum amount of vapor that may pass through the membrane 428 at one time.

The membrane 428 is illustrated as a generally flat membrane 428. However, the membrane 428 may also be a cylinder or may be pleated to increase the surface area of the membrane 428. One skilled in the art would know the proper shape for a membrane 428 for a particular valve assembly 110 arrangement.

Additionally, as the membrane 428 is exposed to liquid, the liquid may slow the flow rate of the vapor through the membrane 428. Walls 442 of the fuel tank 412 may help deter liquid from reaching the membrane 428 to maintain the vapor flow rate through the membrane 428 at a predetermined level.

The valve assembly 410 includes a pressure relief valve 434. The pressure relief valve 434 includes a ball 446, located at least partially within the housing opening 430 defined by the housing 414. The pressure relief valve 434 is a head valve. That is, the pressure relief valve 434 is located above the fuel tank 412. Further, the pressure relief valve 434 is located between the membrane 428 and the vapor outlet 422.

A housing passage 448 may also be defined by the housing 414 and allow the vapor flow to bypass the housing opening 430. The ball 446 is located partially within the housing cavity 420 and the housing opening 430. The housing opening 430 may have an enlarged or tapered portion 450 for guiding and supporting the ball 446. Vapor may exit the fuel tank 412 through the housing passage 448, which includes an orifice limiting the flow. When the vapor pressure within the fuel tank 412 reaches a sufficient level the ball 446 is lifted off the housing 414, as shown. The vapor may exit through the housing passage 448 and the housing opening 430 around the sides of the ball 446, as illustrated by arrows V. The tapered portion 450 helps guide the ball 446 into the proper position with respect to the housing 414. As the vapor escapes the fuel tank 412 the pressure within the fuel tank 412 decreases and the ball 446 returns to the resting position (not shown) on the housing 414. Vapor may still exit the fuel tank 412 through the housing passage 448, but it will not exit through the housing opening 430 until the pressure within the fuel tank 412 again increases to a level that will raise the ball 446 off the housing 414.

Figure 6:
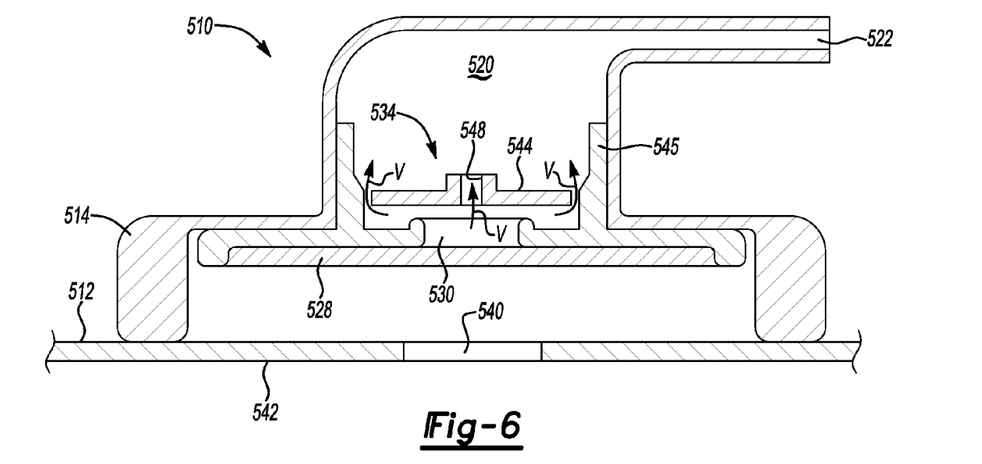
FIG. 6 is a schematic cross-sectional illustration of a sixth embodiment of a small engine valve assembly.

FIG. 6 illustrates a sixth embodiment of the valve assembly 510 mounted to a fuel tank 512. The valve assembly 510 is for use with a fuel tank 512 for a small engine. The valve assembly 510 has a housing 514. The housing 514 is mounted externally of the fuel tank 512. The embodiment shown illustrates the valve assembly 510 mounted directly to the fuel tank 512. Other arrangements for mounting the valve assembly 510 to the fuel tank 412, or incorporating the valve assembly 510 into other components prior to mounting on the fuel tank 512 may also be utilized. One skilled in the art would know the desired arrangements for particular fuel tank 512 and valve assembly 510 combinations.

The fuel tank 512 defines a fuel tank opening 540, which allows vapor to exit the fuel tank 512. The housing 514 also defines a housing cavity 520, also referred to as a vent opening, which is in fluid communication with a vapor outlet 522. The vapor outlet 522 may lead to a vapor recovery canister (not shown) or other component outside of the fuel tank 512.

A membrane 528 is secured to the housing 514. The membrane 528 may be secured to the housing 514 by welding, adhesive, heat sealing, insert molding, or other methods. One skilled in the art would know the appropriate attachment required for particular membrane 528 and housing 514 arrangements.

The membrane 528 is a liquid discriminating, vapor permeable membrane. That is, the membrane 528 is of a material that allows vapor to pass through the membrane 528 but prohibits liquid from passing through. At least one housing opening 530 is located within the housing 514 and allows vapor from the fuel tank 512 to enter the housing cavity 520. The membrane 528 is secured to the housing 514 such that the membrane extends across the entire housing opening 530. The size of the housing opening 530 may be selected to control the maximum amount of vapor that may pass through the membrane 528 at one time. The membrane 528 may also be secured to the housing 514 such that the membrane 528 extends over the entire fuel tank opening 540. The fuel tank opening 514 may alternatively, be set to control the maximum amount of vapor that may pass through the membrane 528 at one time.

The membrane 528 is illustrated as a generally flat membrane 528. However, the membrane 528 may also be a cylinder or may be pleated to increase the surface area of the membrane 528. One skilled in the art would know the proper shape for a membrane 528 for a particular valve assembly 510 arrangement.

Additionally, as the membrane 528 is exposed to liquid, the liquid may slow the flow rate of the vapor through the membrane 528. Walls 542 of the fuel tank 512 may help deter liquid from reaching the membrane 528 to maintain the vapor flow rate through the membrane 528 at a predetermined level.

The valve assembly 510 includes a pressure relief valve 534 which includes a disc (or plate) 544 located above or downstream of the housing opening 530. The pressure relief valve 534 is a head valve. That is, the pressure relief valve 534 is located above the fuel tank 512. Further, the pressure relief valve 534 is located between the membrane 528 and the vapor outlet 522.

The disc 544 is located above the housing 514 within the housing cavity 520. Vapor may exit the fuel tank 512 through the housing opening 530, which limits the flow. When the vapor pressure within the fuel tank 512 reaches a sufficient level, the disc 544 is lifted off the housing 514, as shown. Fingers 545 on the housing 514 may assist in guiding the disc 544. The vapor may exit through the housing opening 530 around the sides of the disc 544, as illustrated by arrows V. As the vapor escapes the fuel tank 512, the pressure within the fuel tank 512 decreases and the disc 544 returns to the resting position (not shown) on the housing 514. The disc 544 will remain in the resting position until the pressure within the fuel tank 512 again increases to a level that will raise the disc 544 off the housing 514.

The disc 544 may also define a disc opening 548. The disc opening 548 is in vertical alignment with the housing opening 530. The disc opening 548 may be smaller that the housing opening 530 to restrict the flow of vapor from the fuel tank 512. Alternately, the disc opening 548 may be larger than the housing opening 530 and the housing opening 530 will control the maximum flow rate of the vapor from the fuel tank 512. In either instance, the disc opening 548 will allow vapor to flow from the fuel tank 512 through the disc 544 when the disc is in the resting position.

Figure 7:
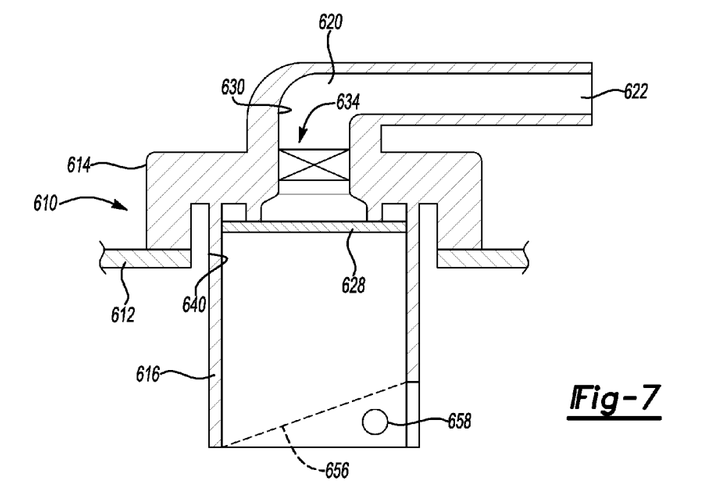
FIG. 7 is a schematic cross-sectional illustration of a seventh embodiment of a small engine valve assembly and a fuel tank.

FIG. 7 illustrates a seventh embodiment of the valve assembly 610 mounted to a fuel tank 612. The valve assembly 610 is for use with a fuel tank 612 for a small engine. The valve assembly 610 has a housing 614. The housing 614 is mounted externally of the fuel tank 612. The embodiment shown illustrates the valve assembly 610 mounted directly to the fuel tank 612. Other arrangement for mounting the valve assembly 610 to the fuel tank 612, or incorporating the valve assembly 610 into other components prior to mounting on the fuel tank 612 may also be used. One skilled in the art would know the desired arrangements for particular fuel tank 612 and valve assembly 610 combinations.

The fuel tank 612 defines a fuel tank opening 640 which allows vapor to exit the fuel tank 612. The housing 614 also defines a housing cavity 620, also referred to as a vent opening, which is in fluid communication with a vapor outlet 622. The vapor outlet 622 may lead to a vapor recovery canister (not shown) or other component outside of the fuel tank 612.

A membrane 628 is secured to the housing 614. The membrane 628 may be secured to the housing 614 by welding, adhesive, heat sealing, insert molding, or other methods. One skilled in the art would know the appropriate attachment required for particular membrane 628 and housing 614 arrangements.

The membrane 628 is a liquid discriminating, vapor permeable membrane. That is, the membrane 628 is of a material that allows vapor to pass through the membrane 628 but prohibits liquid from passing through. At least one housing opening 630, located within the housing 614, allows vapor from the fuel tank 612 to enter the housing cavity 620. The membrane 628 is secured to the housing 614 such that the membrane 628 extends over the entire housing opening 630. The size of the housing opening 630 may be selected to control the maximum amount of vapor that may pass through the membrane 628 at one time. The membrane may also be secured to the housing 614 such that the membrane 628 extends over the entire fuel tank opening 640. The fuel tank opening 640 may alternatively be set to control the maximum amount of vapor that may pass through the membrane 628 at one time.

The membrane 628 is illustrated as a generally flat membrane 628. However, the membrane 628 may also be a cylinder or may be pleated to increase the surface area of the membrane 628. One skilled in the art would know the proper shape for a membrane 628 for a particular valve assembly 610 arrangement.

The valve assembly 610 includes a pressure relief valve 634, shown schematically. The pressure relief valve 634 is a head valve of a known type that can be used with the valve assembly 610. That is, the pressure relief valve 634 is located above the fuel tank 612. One skilled in the art would know the proper type of pressure relief valve 634 for a particular application. Further, the pressure relief valve 634 is located between the membrane 628 and the vapor outlet 622.

Additionally, the valve assembly 610 may include a soft shut off feature on a first portion 616 of the housing 614. The housing portion 616 in this instance is often referred to as a dip tube. The housing portion 616 extends downward within the fuel tank 612. As is known to those skilled in the art, the housing portion 616 may provide an air pocket to control shut off of a fuel pump when filling the fuel tank 612. In the embodiment shown, the housing portion 616 has a tapered edge 656 around at least a portion of the housing portion 616.

The housing portion 616 defines a fuel shut off aperture 658. The tapered edge 656 and the fuel shut off aperture 658 restrict vapor flow as the fuel tank 612 is filled with fluid. Therefore, the housing portion 616 will accommodate sloshing as the fuel tank 612 is filled by minimizing the amount of liquid from the sloshing that reaches the membrane 628. As the membrane 628 is exposed to liquid, the liquid may slow the flow rate of the vapor through the membrane 628. Thus, the housing portion 616 may help maintain the vapor flow rate through the membrane 128 at a predetermined level.

The tapered edge 656 and fuel shut off aperture 658 can be used together or individually to restrict vapor flow into the housing as the liquid level rises until the tapered edge 656 and the fuel shut off aperture 658 are completely submerged.

Figure 8:
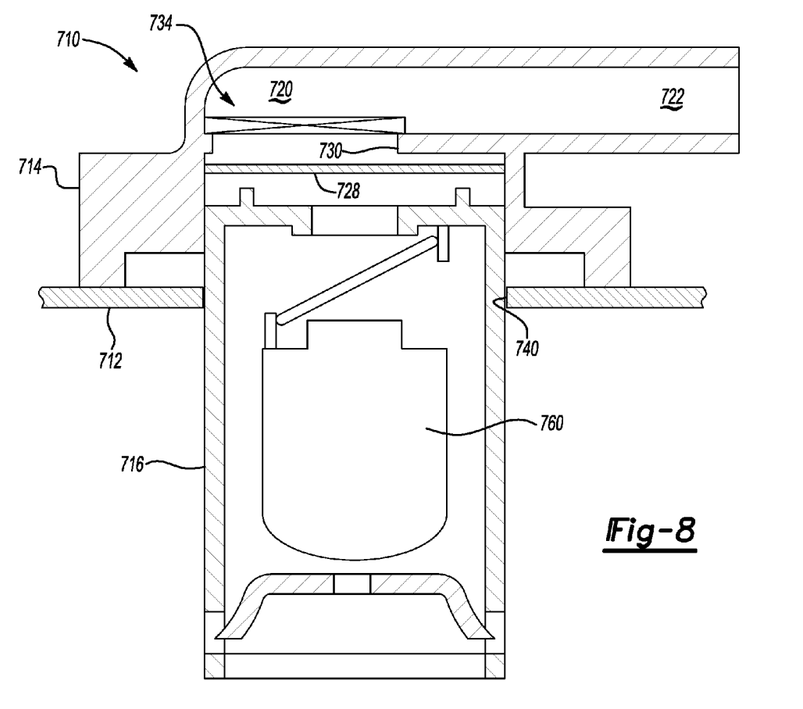
FIG. 8 is a schematic cross-sectional illustration of an eighth embodiment of a small engine valve assembly.

FIG. 8 illustrates an eighth embodiment of the valve assembly 710 mounted to a fuel tank 712. The valve assembly 710 is for use with a fuel tank 712 for a small engine. The valve assembly 710 has a housing 714. The housing 714 is mounted externally of the fuel tank 712. The embodiment shown illustrates the valve assembly 710 mounted directly to the fuel tank 712. Other arrangements for mounting the valve assembly 710 to the fuel tank 712, or incorporating the valve assembly 710 into other components prior to mounting on the fuel tank 712 may also be used. One skilled in the art would know the desired arrangements for particular fuel tank 712 and valve assembly 710 combinations.

The fuel tank 712 defines a fuel tank opening 740 that allows vapor to exit the fuel tank 712. The housing 714 also defines a housing cavity 720, also referred to as a vent opening, which is in fluid communication with a vapor outlet 722.

A membrane 728 is secured to the housing 714. The membrane 728 may be secured to the housing 714 by welding, adhesive, heat sealing, insert molding, or other methods. One skilled in the art would know the appropriate attachment required for particular membrane 728 and housing 714 arrangements.

The membrane 728 is a liquid discriminating, vapor permeable membrane. That is, the membrane 728 is of a material that allows vapor to pass through the membrane 728 but prohibits liquid from passing through. At least one housing opening 730 is located within the housing 714 and allows vapor from the fuel tank 712 to enter the housing cavity 720. The membrane 728 is secured to the housing 714 such that the membrane 728 extends over the entire housing opening 730. The size of the housing opening 730 may be selected to control the maximum amount of vapor that may pass through the membrane 728 at one time. The membrane may also be secured to the housing 714 such that the membrane 728 extends over the entire fuel tank opening 740. The fuel tank opening 740 may alternatively be selected to control the maximum amount of vapor that may pass through the membrane 728 at one time.

The membrane 728 is illustrated as a generally flat membrane 728. However, the membrane 728 may also be a cylinder or may be pleated to increase the surface area of the membrane 728. One skilled in the art would know the proper shape for a membrane 728 for a particular valve assembly 710 arrangement.

The valve assembly 710 includes a pressure relief valve 734, shown schematically. The pressure relief valve 734 is a head valve of a known type that can be used with the valve assembly 710. That is, the pressure relief valve 734 is located above the fuel tank 712. One skilled in the art would know the proper type of pressure relief valve 734 for a particular application. Further, the pressure relief valve 734 is located between the membrane 728 and the vapor outlet 722.

Additionally, a float 760 is located within a portion 716 of the housing 714. The housing portion 716 extends downward within the fuel tank 712. The float 760 is located within the first housing portion 716 which may also be used to control fuel shut off at a fuel pump, as is known in the art.

Additionally, the housing portion 716 helps control the flow rate of the vapor through the membrane 728. That is, as the membrane 728 is exposed to liquid, the liquid may slow the flow rate of the vapor through the membrane 728. The housing portion 716 deters liquid from reaching the membrane 728. Thus, the housing portion 716 helps maintain the vapor flow rate through the membrane 728 at a predetermined level.

Figure 9:
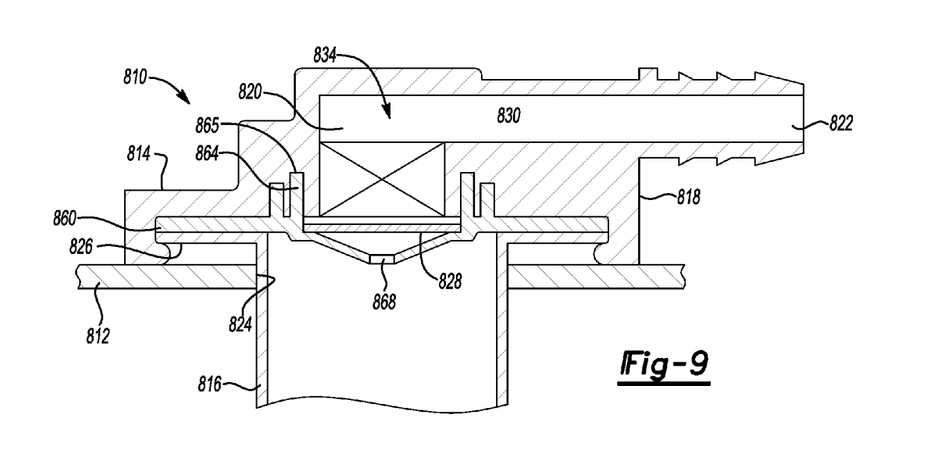
FIG. 9 is a schematic cross-sectional illustration of a ninth embodiment of a small engine valve assembly.
Figure 10:
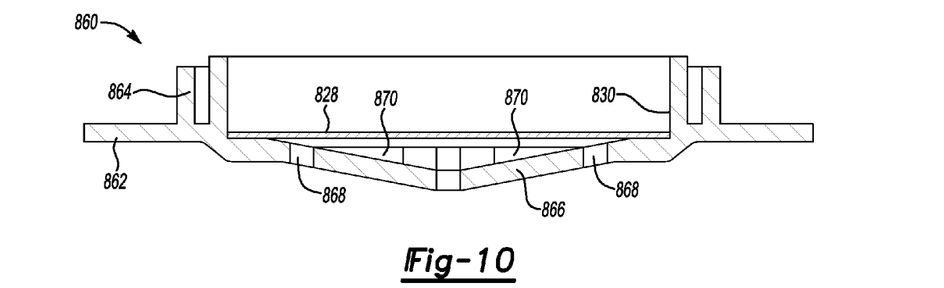
FIG. 10 is a schematic cross-sectional illustration of a membrane support for the ninth embodiment of the valve assembly of FIG. 9.
Figure 11:
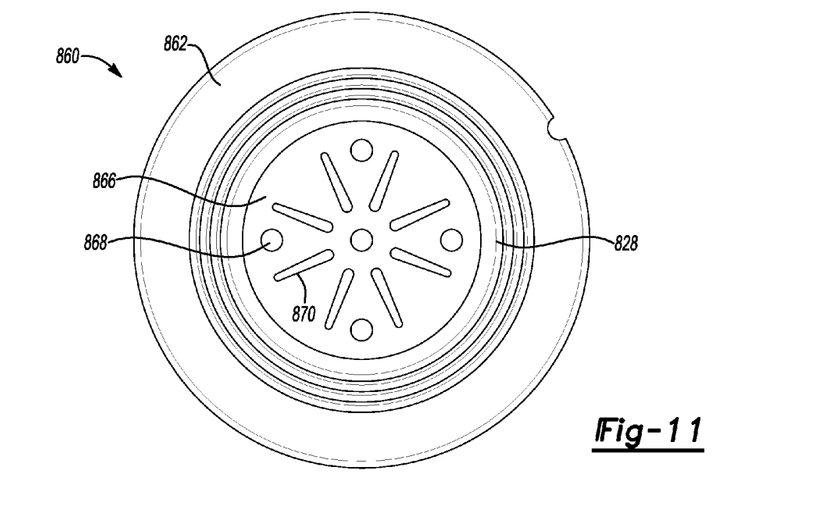
FIG. 11 is a schematic end view illustration of the membrane support for the ninth embodiment of the valve assembly of FIGS. 9 and 10.

FIGS. 9-11 illustrate a ninth embodiment of the valve assembly 810 mounted to a fuel tank 812. The valve assembly 810 is for use with a fuel tank 812 for a small engine. The valve assembly 810 has a housing 814. A first housing portion 816 is located primarily within the fuel tank 812. A second housing portion 818 is located primarily outside of the fuel tank 812. The embodiment shown illustrates the valve assembly 810 mounted directly to the fuel tank 812. Other arrangements for mounting the valve assembly 810 to the fuel tank 812 or incorporating the valve assembly 810 into other components prior to mounting on the fuel tank 812 may also be used. One skilled in the art would know the desired arrangements for particular fuel tank 812 and valve assembly 810 combinations.

The housing 814 defines a housing cavity 820, also referred to as a vent opening, which is in fluid communication with a vapor outlet 822. The first housing portion 816 is inserted within a tank hole 824 in the fuel tank 812. The first housing portion 816 could also be mounted externally with a passageway that allows communication with the interior of the fuel tank 812. The first housing portion 816 includes a flange 826 which is located outside of the fuel tank 812 to prevent the valve assembly 810 from passing entirely through the tank hole 824 and into the fuel tank 812. The second housing portion 818 is sometimes referred to as the vapor recovery side of the housing 814. The second housing portion 818 is secured to the first housing portion 816 at the flange 826. A carrier 860 is located between the first housing portion 816 and the second housing portion 818. Securing the second housing portion 818 on the first housing portion 816 retains the carrier 860 to the housing 814.

FIG. 10 illustrates an enlarged cross-sectional view of the carrier 860, taken at a different cross-section than FIG. 9, and FIG. 11 illustrates a bottom view of the carrier 860 of FIG. 9. The carrier 860 is generally annular in shape and has a main body 862. At least one finger 864 protrudes upwardly from the main body 862. The finger 864 corresponds to indentations 865 (shown in FIG. 9) on the second housing portion 818 when the carrier 860 is assembled with the housing 814. As discussed above, and illustrated in FIG. 9, the main body 862 is secured between the first housing portion 816 and the second housing portion 818 when the valve assembly 810 is assembled. The annular shape of the carrier 860 defines a housing opening 830 through which vapor within the fuel tank 812 can vent through to the vapor outlet 822 (shown in FIG. 9).

A membrane 828 is secured to the carrier 860. The membrane 828 may be secured to the carrier 860 by welding, adhesive, heat sealing, insert molding, or other methods. One skilled in the art would know the appropriate attachment required for particular carrier 860 and membrane 828 arrangements.

The membrane 828 is a liquid discriminating, vapor permeable membrane. That is, the membrane 828 is of a material that allows vapor to pass through the membrane 828 but prohibits liquid from passing through. The membrane 828 extends over the entire housing opening 830. The size of the housing opening 830 may be set to control the maximum amount of vapor that may pass through the membrane 828 at one time. The membrane 828 is illustrated as a generally flat membrane 828. However, the membrane 828 may also be a cylinder or may be pleated to increase the surface area of the membrane 828. One skilled in the art would know the proper shape for a membrane 828 for a particular valve assembly 810 arrangement.

The valve assembly 810 includes a pressure relief valve 834, shown schematically located above the membrane 828. The pressure relief valve 834 is a head valve of a known type that can be used with the valve assembly 810. That is, the pressure relief valve 834 is located above the fuel tank 812. One skilled in the art would know the proper type of pressure relief valve 834 for a particular application. Further, the pressure relief valve 834 is located between the membrane 828 and the vapor outlet 822.

As the membrane 828 is exposed to liquid, the liquid may slow the flow rate of the vapor through the membrane. Thus, a deflector 866 deters liquid from reaching the membrane 828 to help maintain the vapor flow rate through the membrane 828 at a predetermined level.

The deflector 866 extends downwardly and inwardly from the main body 862 of the carrier 860. The deflector 866 defines at least one deflector opening 868 and may define a plurality of deflector openings 868. The deflector 866 helps direct liquid away from the membrane 828 and the housing cavity 820 while the deflector opening 868 allows vapor to pass the deflector 866 and exit the fuel tank 812 through the membrane 828. The size and number of deflector openings 868 may be selected to control the maximum amount of vapor that may pass through at one time. Additionally, the deflector 866 may include several layers of material with deflector openings 868 at various locations on each layer of the deflector 866. This would create a winding flow path, further helping deflecting liquid away from the membrane 828.

The carrier 860 may also include a plurality of ribs 870 extending upwardly from the deflector 866. The ribs 870 are arranged radially on the deflector 866, supporting the membrane 828 and stiffening the deflector 866.

While the best modes for carrying out the invention have been described in detail, those familiar with the art to which this invention relates will recognize various alternative designs and embodiments for practicing the invention within the scope of the appended claims.

The invention claimed is:

1. A valve assembly for a fuel tank having a fuel tank opening, the valve assembly comprising:
   a housing defining a housing cavity; wherein the housing further defines a housing opening to allow vapor to enter the housing cavity;
   a membrane secured to the housing on an opposite side of the housing opening than the housing cavity and extending over and exposed to the entire fuel tank opening such that vapor must flow first through the fuel tank opening to the membrane, then through the membrane, and then through the housing opening to reach the housing cavity; wherein the membrane allows the passage of vapor and prevents the passage of liquid;
   a head valve located within the housing to control vapor flow from the housing cavity; and
   wherein the housing opening provides a smaller flow area than each of the fuel tank opening, the membrane and the housing cavity.

2. The valve assembly of claim 1, wherein the housing further defines a vapor outlet and the head valve further includes a diaphragm and a valve spring configured to bias the diaphragm to a seated position on the housing to at least partially block the vapor outlet and thereby selectively prevent vapor within the housing cavity from exiting the housing through the vapor outlet.

3. The valve assembly of claim 2, wherein the housing is configured to define a passage from the diaphragm to the vapor outlet; and wherein the valve spring is aligned with the passage to the vapor outlet so that vapor pressure in the housing cavity acts only on an outer periphery of the diaphragm when the diaphragm is in the position seated on the housing.

4. The valve assembly of claim 2, wherein the housing is configured to define a passage from the diaphragm to the vapor outlet that extends laterally with respect to the housing opening.

5. The valve assembly of claim 2, wherein the housing is configured to define a passage from the diaphragm to the vapor outlet that extends laterally with respect to the diaphragm.

6. The valve assembly of claim 2, wherein the housing is configured to define a passage from the diaphragm to the vapor outlet that extends laterally with respect to the membrane.

7. An apparatus comprising:
   a fuel tank having a fuel tank wall defining a fuel tank opening;
   a valve assembly including:
      a housing mounted to the fuel tank wall around the fuel tank opening so that the valve assembly is entirely outside of the fuel tank and the housing establishes fluid communication between the fuel tank opening and a housing opening defined by the housing; wherein the housing further defines a housing cavity;
      a membrane secured to the housing between the fuel tank opening and the housing opening and extending over and exposed to the entire fuel tank opening; wherein the housing cavity is on an opposite side of the housing opening than the membrane such that vapor must flow through the fuel tank opening, then through the membrane and then through the housing opening to reach the housing cavity; wherein the membrane allows the passage of vapor and prevents the passage of liquid;
      a head valve located within the housing on an opposite side of the housing cavity than the housing opening and configured to control vapor flow from the housing cavity; and
      wherein the housing opening provides a smaller flow area than each of the membrane, the housing cavity, and the fuel tank opening.

8. The apparatus of claim 7, wherein the housing further defines a vapor outlet and the head valve further includes a diaphragm and a valve spring configured to bias the diaphragm to a seated position to at least partially block the vapor outlet and thereby selectively prevent vapor within the housing cavity from exiting the housing through the vapor outlet.

9. The apparatus of claim 8, wherein the housing is configured to define a passage from the diaphragm to the vapor outlet; wherein the head valve includes a diaphragm and a valve spring configured to bias the diaphragm to a seated position on the housing to at least partially block the vapor outlet; and
   wherein the valve spring is aligned with the passage to the vapor outlet so that vapor pressure in the housing cavity acts only on an outer periphery of the diaphragm when the diaphragm is in the seated position.

* * * * *